Dec. 4, 1951  C. W. ARMISTEAD  2,576,989
OPERA GLASSES WITH FILM STRIP MOUNTED THEREON
Filed Feb. 23, 1950
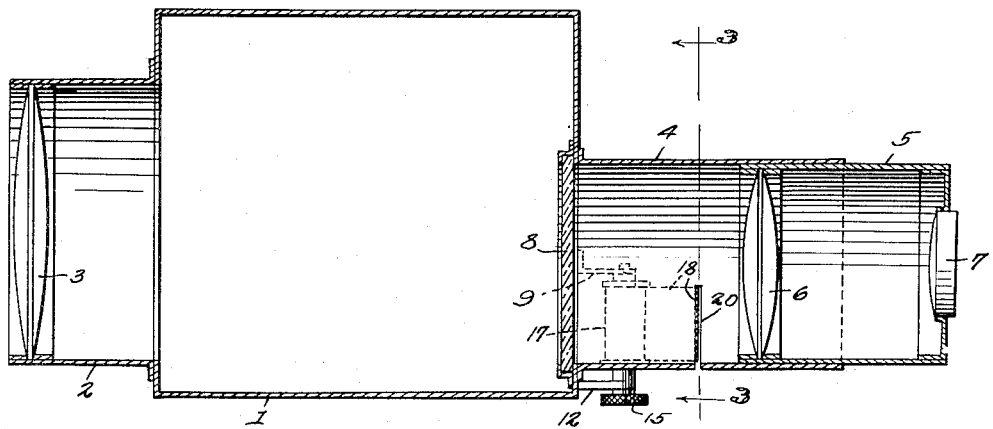
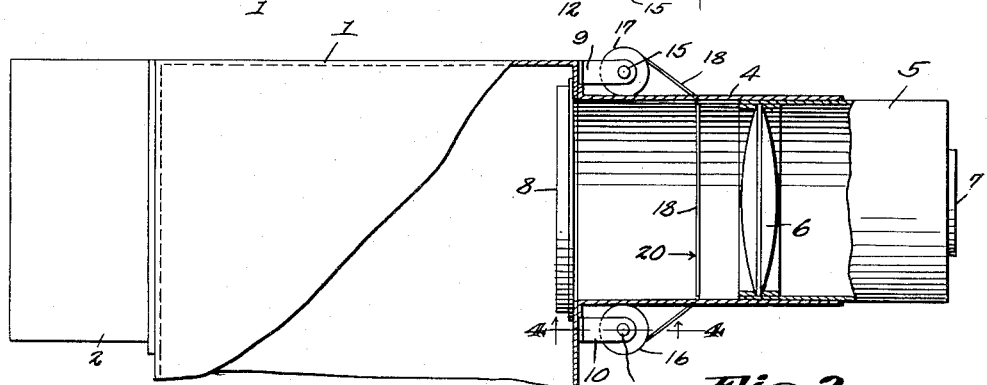
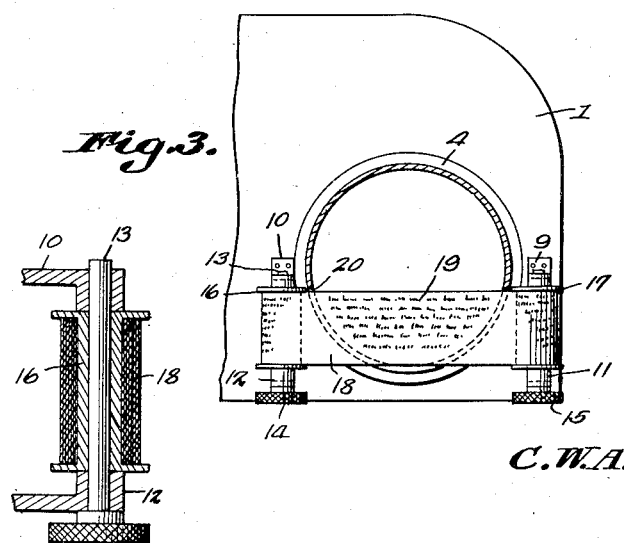
C. W. Armistead
INVENTOR
BY
ATTORNEYS.

Patented Dec. 4, 1951

2,576,989

UNITED STATES PATENT OFFICE 2,576,989

OPERA GLASSES WITH FILM STRIP MOUNTED THEREON

Charles W. Armistead, Shreveport, La.

Application February 23, 1950, Serial No. 145,670

3 Claims. (Cl. 88—34)

1

This invention relates to opera glasses or binoculars, and more particularly, has reference to a combined binoculars and libretto viewing means.

Heretofore, it has been difficult for operagoers to follow the stage action and the libretto at the same time. Obviously, the casting of the eyes downward to find one's place in the libretto and read further therein is time consuming and results in complete loss of sight of the action upon the opera stage. There has been, heretofore, the further inconvenience resulting from the general lack of good lighting for reading the libretto.

The main object of the present invention is to enable one to follow the libretto of the opera without losing sight of the stage action.

To this end, the invention, described quite briefly, includes a modification of one half of a conventional set of binoculars, wherein a pair of reels is mounted upon the instrument, there being wound between said reels a micro-film upon which is printed the libretto of the opera, said film extending through a slot in the barrel of the binoculars and being so located as to be at the common focal point of the objective and eye piece lens systems, thus to enable one to follow the stage action while at the same time following a corresponding portion of the libretto. The invention is so designed as to enable the user of the instrument to utilize the light from the operatic stage for the purpose of reading the libretto, as well as the magnifying power of the eye piece, said eye piece magnifying means and stage lighting being turned by the invention to the desirable purpose of aiding in the illumination and enlargement of the micro-film.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing

Fig. 1 is a longitudinal section through the right half of a set of binoculars equipped with the present invention.

Fig. 2 is a view partly in top plan and partly in horizontal longitudinal section.

Fig. 3 is a section taken substantially on line 3—3 of Fig. 1.

Fig. 4 is an enlarged detail section taken substantially on line 4—4 of Fig. 2.

Referring to the drawing in detail, there has been illustrated in the drawing a more or less conventional binoculars or more particularly, the right half of a conventional set of binoculars, including the usual prism casing 1 from the front of which extends the objective lens casing 2 in which is mounted the objective lens 3.

2

Extended rearwardly from the prism casing 1 is the barrel 4 in which telescopes the adjustable eye piece 5 in the inner end of which is mounted the positive lens 6, there being mounted in the outer end of said eye piece the other positive lens 7, the positive lenses 6 and 7 comprising the usual well known positive lens system. Interposed between the barrel 4 and the prism casing 1 is the ordinary plane zero lens 8.

The construction so far described is conventional in a set of binoculars, the other half of the binoculars, not shown, being of identical but opposite form and arrangement. The invention is adapted for either half of the binoculars, but preferably the right half is utilized, as in the illustrated example.

To the rear wall of the prism casing 1, at opposite sides of the barrel 4, are secured rearwardly extending upper bearing brackets 9 and 10 respectively, these being respectively aligned vertically with lower bearing brackets 11 and 12 also secured to the rear wall of the prism casing 1 and rearwardly extended from said rear wall.

The respective pairs of bearing brackets have aligned openings in which are journaled reel shafts, these shafts being identical and comprising a shank 13 extended through the registering openings of the bearings 10 and 12, the lower end of said shank being integral with or having otherwise rigidly secured thereto the thumb screw 14. A similar shaft including a thumb screw 15 is journaled in the other pair of bearing brackets 9, 11, at the opposite side of the barrel 4.

Rotatable with the shaft 13 is a spool 16 while rotatable with the shaft 15 is a spool 17, a roll of micro-film being wound upon said spools and being designated 18, said micro-film having printed thereon the printed matter 19 constituting the libretto of the opera. It will be understood that at the beginning of the opera, the micro-film will be wound almost entirely upon the reel or spool 17, one end of said micro-film being extended through a slot 20 extended transversely of the lower portion of the barrel 4, and being connected to the empty spool 16. Then, as the opera progresses, the user rotates the shaft 13 as necessary by rotation of the knurled knob 14, the micro-film roll being slowly unwound from the spool 17 while being wound upon the spool 16.

In this connection, it may be noted that in accordance with the present invention, the portion of the micro-film that extends through the transverse slot 20 is located at the common focal point of the objective and the positive lens systems, thus to permit one to view distant objects, that is, the stage action, simultaneously with the libretto printed upon the portion of the micro-film extending transversely through the slot 20.

In accordance with the invention it will be seen that the invention utilizes the light from the operatic stage for illumination of the micro-film to permit the film to be easily read, while the necessary magnifying power is supplied by the eye piece lens systems.

There is no detraction from the enjoyment of a full view of the stage, meanwhile, because the other half of the binoculars will be fully unobstructed as to view.

It will be understood that if it is desired to use the set of binoculars without a roll of microfilm extending therethrough, it would be well within the spirit of the invention to provide a strip of metal formed to the same curvature as the curvature of the barrel 4, so as to fill the slot 20.

Another important characteristic of the invention resides in the fact that the set of binoculars is held in the ordinary manner. Thus, the set of binoculars raised to the eyes and grasped in both hands or in the right hand alone is so held by the user as to cause the right thumb to extend under the barrel 4 at the right side of the binoculars, to the location of the knurled knob 14. It is, accordingly, a simple matter for the holder of the binoculars to rotate the knob 14 as necessary by simple forward pressure, without jogging of the instrument or other inconvenience or annoyance.

It will be understood that the spools are made removable in any suitable manner, so as to permit the use of a selected roll of micro-film.

In the present instance, one example of how this can be accomplished is shown, wherein the shafts are press-fitted through the respective spools, so that there is a frictional binding between the shafts and the bores of the spools, for rotation of the spools with the shafts. Additionally, with this construction the spools themselves serve as means for holding the shafts against the possibility of dropping out of the bearings. Whenever, however, one desires to remove one or both spools, it is necessary simply that the knobs 14 and 15 be pulled downwardly, whereupon the shafts are pulled out of the spools permitting removal of the spools and substitution of new ones.

It is to be noted that the location of the spools exteriorly of the barrel at opposite sides thereof is so arranged, as readily seen from Fig. 3, as to cause the spools to be approximately tangent to the barrel when the barrel is viewed in cross section. As a result, the spools are so positioned as to locate the thumb screws 14 and 15 exactly where desired to permit engagement of the thumb screws by the thumb of a user when the instrument is held normally with the hands.

It is to be further noted that the arrangement is one wherein the spools are offset from the transverse slot longitudinally of the barrel, this being readily seen from Fig. 2, and as a result, the strip or web of film extending between the rolls is also offset, by reason of being positioned through the transverse slot. The strip thus is caused to bear at opposite sides of the barrel against one edge of the slot, so as to be tensioned or stretched taut across the barrel.

It is to be understood that although one example of use of the invention has been described herein, namely, the viewing of an opera, many other uses may suggest themselves, as for example, the viewing of an athletic contest while viewing the roster of players.

What is claimed is:

1. In an optical viewing instrument the combination, with an objective lens system, a prism chamber, a barrel, and a positive lens system mounted in said barrel, the barrel having a transverse slot extending through part of its circumference: of bearing means mounted upon the wall of the prism chamber exteriorly thereof and of the barrel, said bearing means being offset from said slot longitudinally of the barrel and being respectively located at opposite sides of the barrel; spools mounted rotatably upon said bearing means at opposite sides of the barrel, said spools being approximately tangent to the barrel; a film strip wound upon the respective spools and extending through the slot across the barrel between said lens systems, the portion of said strip extending across the barrel bearing at opposite ends against an edge of said slot; and means secured to said spools for rotating the spools.

2. In an optical viewing instrument the combination, with an objective lens system, a prism chamber, a barrel, and a positive lens system mounted in said barrel, the barrel having a transverse slot extending through approximately half its circumference: of pairs of bearing brackets mounted upon the wall of the prism chamber exteriorly thereof and of the barrel, said pairs of brackets being offset from said slot longitudinally of the barrel and being respectively located at opposite sides of the barrel; spools extending between and mounted for rotation upon the brackets of each pair of brackets, said spools being approximately tangent to said barrel; a film strip wound upon the respective spools and extending through the slot across the barrel in the common focal plane of the lens systems, said strip having frictional contact at opposite sides of the barrel with an edge of said slot for tensioning the portion of the strip extending across the barrel; and means located outside the barrel and secured to said spools for rotating the spools.

3. In an optical viewing instrument the combination, with an objective lens system, a prism chamber having a flat back wall, a barrel secured to and extending backwardly from said wall, and a positive lens system mounted in the barrel, the barrel having a transverse slot extending through approximately half its circumference and disposed in the plane of said back wall of the prism chamber: of pairs of bearing brackets mounted upon said back wall of the prism chamber exteriorly thereof and of the barrel, said pairs of brackets being offset from said slot longitudinally of the barrel and being respectively located at opposite sides of the barrel; spools extending between and mounted for rotation on the brackets of each pair of brackets, said spools being approximately tangent to said barrel and rotating on axes parallel to the planes of said slot and back wall of the prism chamber; a film strip wound upon the respective spools and extending through the slot across the barrel in the common focal plane of the lens systems, said strip having frictional contact at opposite sides of the barrel with an edge of the slot for tensioning the portion of the strip extending across the barrel; and thumb screws located outside the barrel and secured to said spools for rotation therewith.

CHARLES W. ARMISTEAD.

REFERENCES CITED

The following references are of record in the file of this patent:

UNITED STATES PATENTS

| Number | Name | Date |
| --- | --- | --- |
| 582,719 | Chenoweth et al. | May 18, 1897 |
| 2,282,632 | Wittig | May 12, 1942 |